UNITED STATES PATENT OFFICE.

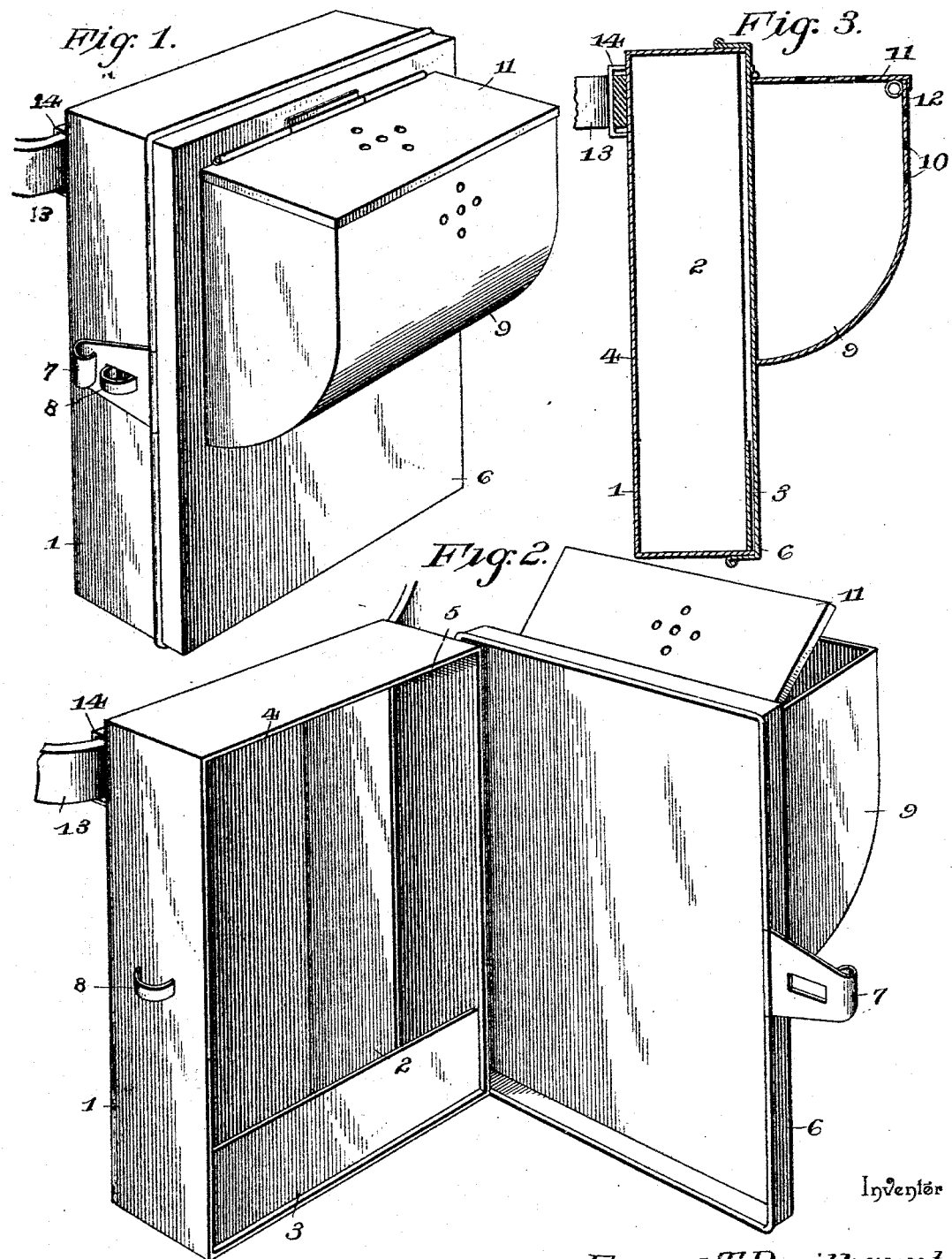

ERNEST T. BREITHAUPT, OF NATCHEZ, MISSISSIPPI.

COMBINED BAIT AND FISHING-TACKLE BOX.

SPECIFICATION forming part of Letters Patent No. 515,899, dated March 6, 1894.

Application filed October 28, 1893. Serial No. 489,348. (No model.)

*To all whom it may concern:*

Be it known that I, ERNEST T. BREITHAUPT, a citizen of the United States, residing at Natchez, in the county of Adams and State of Mississippi, have invented a new and useful Combined Bait and Fishing-Tackle Box, of which the following is a specification.

My invention relates to improvements in bait boxes, the objects in view being to provide a light, simple, and convenient contrivance designed to be strapped to the body of the person, and to accommodate fish bait, hooks, sinkers, quills, and lines, whereby the same may be conveniently carried, are safe and accessible.

With these and other objects in view the invention consists in certain features of construction hereinafter specified and particularly pointed out in the claims.

Referring to the drawings: Figure 1 is a perspective view of a combined fishing tackle and bait box. Fig. 2 is a similar view, the box being open. Fig. 3 is a vertical transverse sectional view of the same.

Like numerals of reference indicate like parts in all the figures of the drawings.

The oblong box 1 is preferably formed of tin, the same being provided with an internal vertical partition 2, located at one side of the transverse center of the interior of the box. The opening in the front of the box is partially covered by a horizontal front wall 3. By arranging the partition 2 in the box I produce, as will be seen, compartments 4 and 5, the former being larger than the latter.

Hinged to one side of the box is a cover 6, which is flanged around its edges so as to receive the four walls of the box when said cover is closed. A hasp 7 is secured to the free edge of the cover and is designed to lock the same in position by being sprung over a staple 8.

Secured to the front surface of the cover 6 is a bait box 9, the same having its front wall provided with perforations 10, and with a hinged cover 11, likewise perforated at 10, said perforations admitting air for the bait contained in the box. A spring 12 is secured to the under side, near the free edge of the cover 11, and is designed to be sprung by the flared upper edge of the front wall of the bait box, whereby the cover is secured in position.

For conveniently supporting the device upon a strap 13, that may be passed about the body of the wearer, I provide upon the rear side of the box 1, adjacent to the upper end thereof, transversely-opposite keepers 14.

In use it will be understood that the compartment 4 receives the line, sinkers, quills, and other large parts composing the tackle, while the compartment 5 is principally intended for hooks of various sizes.

When it is desired to gain access to the bait box it is simply necessary to raise the cover 11; but when it is necessary to gain access to the box 1, the lower end of said box is swung outwardly until the box, as a whole, is disposed horizontally, when the fastening of the cover 6 is disconnected and the cover swung back to admit the hand of the operator.

From the foregoing description, in connection with the accompanying drawings, it will be seen that I have provided a very simple and convenient device for use by fishermen, whereby the many small parts composing the fishing tackle may be conveniently and accessibly carried.

Having described my invention, what I claim as new is—

1. The herein described bait and tackle box, the same consisting of the box 1, having the hinged cover at one side provided with a securing device, and the bait box secured to the outer surface of said cover and provided with a hinged lid, substantially as specified.

2. The herein described bait and tackle box, consisting of the oblong box 1, longitudinally subdivided by the partition 2, and having the lower partial front wall 3, the hinged cover 6, the hasp and staple, the bait box 9, secured to the cover 6, and having the hinged cover 11, which together with the front wall of the bait box is perforated, the keepers 14 on the rear of the box 1, and the strap passed therethrough, substantially as specified.

In testimony that I claim the foregoing as my own I have hereto affixed my signature in the presence of two witnesses.

ERNEST T. BREITHAUPT.

Witnesses:
GERARD BRANDON,
RICHD. F. REED.